(12) United States Patent
Bhavaraju et al.

(10) Patent No.: US 9,431,682 B2
(45) Date of Patent: *Aug. 30, 2016

(54) DEGRADATION PROTECTION OF SOLID ALKALI ION CONDUCTIVE ELECTROLYTE MEMBRANE

(71) Applicant: Ceramatec, Inc., Salt Lake City, UT (US)

(72) Inventors: Sai Bhavaraju, West Jordan, UT (US); Mathew Robins, Saratoga Springs, UT (US); Chett Boxley, Park City, UT (US)

(73) Assignee: CERAMATEC, INC., Salt Lake City, UT (US)

( * ) Notice: Subject to any disclaimer, the term of this patent is extended or adjusted under 35 U.S.C. 154(b) by 285 days.

This patent is subject to a terminal disclaimer.

(21) Appl. No.: 14/072,468

(22) Filed: Nov. 5, 2013

(65) Prior Publication Data

US 2014/0170443 A1 Jun. 19, 2014

Related U.S. Application Data

(60) Provisional application No. 61/723,122, filed on Dec. 19, 2012.

(51) Int. Cl.
| | |
|---|---|
| *H01M 10/0562* | (2010.01) |
| *H01M 10/42* | (2006.01) |
| *H01M 4/36* | (2006.01) |
| *H01M 10/39* | (2006.01) |
| *H01M 4/52* | (2010.01) |

(52) U.S. Cl.
CPC ......... *H01M 10/4235* (2013.01); *H01M 4/368* (2013.01); *H01M 10/0562* (2013.01); *H01M 10/39* (2013.01); *H01M 10/3918* (2013.01); *H01M 4/52* (2013.01); *H01M 2300/0074* (2013.01)

(58) Field of Classification Search
CPC ................ H01M 10/0562; H01M 10/4235; H01M 4/368
USPC .................. 429/50, 112, 321, 322
See application file for complete search history.

(56) References Cited

U.S. PATENT DOCUMENTS

| | | |
|---|---|---|
| 4,041,215 A | 8/1977 | Kormanyos et al. |
| 4,162,351 A | 7/1979 | Putt et al. |
| 4,244,986 A | 1/1981 | Paruso et al. |
| 4,307,164 A | 12/1981 | Church et al. |
| 4,375,501 A | 3/1983 | Peled et al. |
| 4,427,747 A | 1/1984 | Bennett et al. |
| 4,546,055 A | 10/1985 | Coetzer et al. |
| 4,579,796 A | 4/1986 | Muramatsu |
| 4,753,858 A | 6/1988 | Jow |
| 5,139,897 A | 8/1992 | Wedlake |
| 5,264,298 A | 11/1993 | Townsend |
| 5,290,405 A | 3/1994 | Joshi et al. |
| 5,422,197 A | 6/1995 | Zito |
| 5,525,442 A | 6/1996 | Shuster |
| 5,552,244 A | 9/1996 | Griffin et al. |
| 5,563,006 A | 10/1996 | Von Benda et al. |
| 5,686,201 A | 11/1997 | Chu |
| 6,030,720 A | 2/2000 | Chu et al. |
| 6,033,343 A | 3/2000 | Licht |
| 6,376,123 B1 | 4/2002 | Chu |
| 6,410,181 B1 | 6/2002 | Spillman et al. |
| 6,852,450 B2 | 2/2005 | Hwang et al. |
| 6,881,234 B2 | 4/2005 | Towsley |
| 8,012,621 B2 | 9/2011 | Joshi et al. |
| 8,883,339 B2 | 11/2014 | Choi |
| 8,968,902 B2 * | 3/2015 | Coors ............... H01B 1/122 429/103 |
| 2002/0150818 A1 | 10/2002 | Amatucci et al. |
| 2002/0172871 A1 | 11/2002 | Shucker |
| 2004/0065543 A1 | 4/2004 | Kovarsky |
| 2005/0109617 A1 | 5/2005 | Ono et al. |
| 2005/0260460 A1 | 11/2005 | Kishi et al. |
| 2006/0141346 A1 | 6/2006 | Gordon et al. |
| 2006/0177732 A1 | 8/2006 | Visco et al. |
| 2006/0226022 A1 | 10/2006 | Balagopal et al. |
| 2006/0257734 A1 | 11/2006 | Obata et al. |

(Continued)

FOREIGN PATENT DOCUMENTS

| | | |
|---|---|---|
| JP | 62186470 | 8/1987 |
| JP | 2008293678 | 12/2008 |

(Continued)

OTHER PUBLICATIONS

Young, Lee W., "International Search Report", PCT Search Report for App. No. PCT/US 08/10435, (Nov. 25, 2008),1-2.

Young, Lee W., "Written Opinion of the International Searching Authority", PCT Written Opinion for App. No. PCT/US 08/10435, (Nov. 25, 2008),1-4.

Salminen, Justin et al., "Ionic liquids for rechargeable lithium batteries", Lawrence Berkeley National Laboratory, (Sep. 21),1-19.

Cullen, Sean P., "Office Action for U.S. Appl. No. 12/205,759", (Sep. 16, 2010),1-22.

(Continued)

*Primary Examiner* — Edward Cain
(74) *Attorney, Agent, or Firm* — Paul S. Cha

(57) ABSTRACT

The present invention provides an electrochemical cell having an negative electrode compartment and a positive electrode compartment. A solid alkali ion conductive electrolyte membrane is positioned between the negative electrode compartment and the positive electrode compartment. A catholyte solution in the positive electrode compartment includes a halide ion or pseudohalide ion concentration greater than 3M, which provides degradation protection to the alkali ion conductive electrolyte membrane. The halide ion or pseudohalide ion is selected from chloride, bromide, iodide, azide, thiocyanate, and cyanide. In some embodiments, the electrochemical cell is a molten sodium rechargeable cell which functions at an operating temperature between about 100° C. and about 150° C.

29 Claims, 9 Drawing Sheets

(56) References Cited

U.S. PATENT DOCUMENTS

| | | |
|---|---|---|
| 2007/0048610 A1 | 3/2007 | Tsang et al. |
| 2007/0154762 A1 | 7/2007 | Schucker |
| 2007/0221265 A1 | 9/2007 | Affinito et al. |
| 2008/0268327 A1 | 10/2008 | Gordon et al. |
| 2009/0061288 A1 | 3/2009 | Gordon et al. |
| 2009/0134040 A1 | 5/2009 | Gordon et al. |
| 2009/0134842 A1 | 5/2009 | Joshi et al. |
| 2009/0136830 A1 | 5/2009 | Gordon |
| 2009/0189567 A1 | 7/2009 | Joshi et al. |
| 2009/0212743 A1 | 8/2009 | Hagiwara et al. |
| 2010/0089762 A1 | 4/2010 | Gordon |
| 2010/0239893 A1 | 9/2010 | Gordon et al. |
| 2010/0261051 A1 | 10/2010 | Okada et al. |
| 2010/0285372 A1 | 11/2010 | Lee et al. |
| 2011/0104526 A1 | 5/2011 | Boxley et al. |
| 2012/0021273 A1 | 1/2012 | Ohmori et al. |
| 2012/0045695 A1 | 2/2012 | Sheem et al. |
| 2012/0126752 A1 | 5/2012 | Joshi et al. |
| 2012/0141856 A1 | 6/2012 | Gordon et al. |
| 2012/0214043 A1 | 8/2012 | Olschimke et al. |
| 2012/0219833 A1 | 8/2012 | Coors et al. |
| 2012/0219843 A1 | 8/2012 | Bogdan et al. |

FOREIGN PATENT DOCUMENTS

| | | |
|---|---|---|
| KR | 100651246 | 8/2005 |
| WO | WO 2005/091946 | 10/2005 |
| WO | WO 2011057135 | 8/2011 |
| WO | WO 2012061823 | 7/2012 |

OTHER PUBLICATIONS

Cullen, Sean P., "Office Action for U.S. Appl. No. 12/205,759", (Apr. 13, 2011),1-15.
Lee, Kang Young "International Search Report", International App. No. PCT/US2010/055718, (Jun. 21, 2011),1-3.
Lee, Kang Young "Written Opinion", International App. No. PCT/US2010/055718, (Jun. 21, 2011),1-3.
Suzuki, et al., "Bibliographical Data and Abstract (English Language)", Japanese Patent application JP62-186470, (Aug. 14, 1987),1-2.
Yun, Cho K., "Internationial Search Report", PCT App. No. PCT/US2012/036959 (corresponding to U.S. Appl. No. 13/466,844), (Nov. 23, 2012),1-3.
Yun, Cho K., "Written Opinion of the International Searching Authority", PCT. App. No. PCT/US2012/036959 (corresponding to U.S. Appl. No. 13/466,844), (Nov. 23, 2012),1-5.
Cullen, Sean P., "Non Final Office Action", U.S. Appl. No. 12/205,759, (Apr. 5, 2013),1-17.
Lee, Dong W., "International Serach Report", PCT Application No. PCT/US13/68552 (Corresponding to U.S. Appl. No. 14/072,468), (Jan. 24, 2014),1-3.
Lee, Dong W., "Written Opinion of the International Searching Authority", PCT Application No. PCT/US2013/68552 (Corresponding to U.S. Appl. No. 14/072,468), (Jan. 24, 2014),1-5.
Lee, Dong W., "International Search Report", PCT Application No. PCT/US13/62386 (Corresponding to U.S. Appl. No. 14/040,241), (Dec. 23, 2013),1-3.
Lee, Dong W., "Written Opinion of the International Search Authority", PCT Application No. PCT/US2013/62386 (Corresponding to U.S. Appl. No. 14/040,241), (Dec. 23, 2014),1-5.
Lee, Dong W., "International Search Report", PCT Application No. PCT/US2013/058403 (Corresponding to U.S. Appl. No. 14/019,651), (Dec. 2, 2013),1-3.
Lee, Dong W., "Written Opinion of the International Searching Authority", PCT Application No. PCT/US2013/058403 (Corresponding to U.S. Appl. No. 14/019,651), (Dec. 2, 2013),1-6.
Parsons, Thomas H., "Non Final Office Action", U.S. Appl. No. 13/466,844, (Feb. 26, 2015),1-22.
Marks, Jacob B., "Non Final Office Action", U.S. Appl. No. 14/469,865, (Apr. 7, 2015),1-6.
Shin, Ju C., "International Search Report", PCT Application No. PCT/US2014/059954 (Corresponding with U.S. Appl. No. 14/511,031) (Jan. 20, 2015),1-3.
Shin, Ju C., "Written Opinion of the International Searching Authority", PCT Application No. PCT/US2014/059954 (Corresponding with U.S. Appl. No. 14/511,031, (Jan. 20, 2015),1-4.
Jarvi, Tommi "Supplementary European Search Report", European Patent Application No. 12783042.0, (Oct. 14, 2014),1-7.
Armand, Michel et al., "ionic-liquid materials for the electrochemical challenges of the future", Nature Materials, (Jul. 24, 2009),621-629.
Doyle, Kevin P., et al., "Dentrite-Free Electrochemical Deposition of Li—Na Alloys from an Ionic Liquid Electrolyte", Journal of The Electrochemical Society, (May 2006),A1353-A1357.
Kim, K et al., "Electrochemical Investigation of Quaternary Ammonium/Aluminum Chloride Ionic Liquids", Journal of The Electrochemical Society, (Jun. 2004),A1168-A1172.
Kim, Ketack et al., "The Role of Additives in the Electroreduction of Sodium Ions in Chloroaluminate-Based Ionic Liquids", Journal of The Electrochemical Society, (Dec. 2004),E9-E13.
Lang, Christopher M., et al., "Cation Electrochemical Stability in Chloroaluminate Ionic Liquids", J. Phys. Chem., (2005),19454-19462.
Cullen, Sean P., "Non-Final Office Action", U.S. Appl. No. 12/725,319, (Jan. 6, 2012),1-10.
Cullen, Sean P., "Final Office Action", U.S. Appl. No. 12/725,319, (Apr. 27, 2012),1-12.
Cho, Jun B., "International Search Report", PCT App. No. US2010/027535 (Corresponding to U.S. Appl. No. 12/725,319), (Oct. 20, 2010),1-4.
Cho, Jun B., "Written Opinion of the International Searching Authority", PCT App. No. US2010/027535 (Corresponding to U.S. Appl. No. 12/725,319), (Oct. 20, 2010),1-5.
Ryu, et al., "Bibliographical Data and Abstract (English Language)", Application Publication for US2007154814, Corresponding to KR10-0651246, (Aug. 22, 2005),1.
Wiedemann, Eric "Supplementary European Search Report", European Patent Application No. 10754004.9 (Corresponding to U.S. Appl. No. 12/725,319, (May 16, 2012),1-6.
Sonoda, et al., "Bibliographical Data and Abstract (English Translation)", Japanese Patent Application JP-59-75985, (Apr. 28, 1984),1-2.
Takeguchi, Yasuhiro "Final Rejection Action", Japanese Patent Application No. 2012-537241, (Jun. 17, 2014),1-6.
"Notice of Allowance", Japanese Patent Application 2012-537241, (May 11, 2015),1-6.
Parsons, Thomas H., "Final Office Action", U.S. Appl. No. 13/466,844, (Aug. 11, 2015),1-13.
Masatsugu, Morimitsu "English Lanuage Abstract", JP2008293678, (Dec. 4, 2008),1.
Peramunage, et al., "A Solid Sulfur Cathode for Aqueous Batteries", Science, vol. 261, (Aug. 20, 1993),1029-1032.
Marks, Jacob B., "Non-Final Office Action", U.S. Appl. No. 12/940,864, (Jun. 18, 2013),1-30.
Marks, Jacob B., "Final Office Action", U.S. Appl. No. 12/940,864, (Jan. 29, 2014),1-11.
Marks, Jacob B., "Notice of Allowance", U.S. Appl. No. 12/940,864, (Jun. 20, 2014),1-7.
Cain, Edward J., "Non Final Office Action", U.S. Appl. No. 14/072,468, (Oct. 5, 2015),1-6.
Quraishi, Kiran "Non-Final Office Action", U.S. Appl. No. 14/040,241, (Oct. 28, 2015),1-12.
Colucci, Rios J., "Non-Final Office Action", U.S. Appl. No. 14/019,651, (Aug. 17, 2015),1-26.

* cited by examiner

DEGRADATION PROTECTION OF SOLID ALKALI ION CONDUCTIVE ELECTROLYTE MEMBRANE

RELATED APPLICATIONS

This application claims the benefit of U.S. Provisional Patent Application No. 61/723,122 filed Nov. 6, 2012, entitled "Degradation Protection of Solid Alkali Ion Conductive Electrolyte Membrane." This prior application is expressly incorporated herein by reference.

FIELD OF THE INVENTION

The present invention relates to electrochemical cells utilizing a solid alkali ion conductive electrolyte membrane and to methods of protecting such membranes from degradation by dissolution. More particularly, the present invention discloses systems and methods for operating an electrochemical cell comprising a solid alkali ion conductive electrolyte membrane and an aqueous catholyte (or positive electrode) solution. Generally, the described systems and methods act to protect the membrane from degradation by dissolution.

BACKGROUND OF THE INVENTION

Electrochemical cells comprising solid alkali ion conductive electrolyte membrane that selectively transport alkali ions are known in the art. By having an alkali ion-selective membrane in the electrochemical cell, alkali ions are allowed to pass between the cell's anolyte compartment (or negative electrode compartment) and catholyte compartment (or positive electrode compartment) while other chemicals are maintained in their original compartments. Thus, through the use of an alkali ion-specific membrane, an electrochemical cell can be engineered to be more efficient and to produce different chemical reactions than would otherwise occur without the membrane.

Solid alkali ion conductive electrolyte membranes are used in electrochemical cells for various reasons, including, but not limited to, being ion conductive, ion selective, water impermeable, chemically stable, electronic insulator, and so forth. By way of example, NaSICON (Na Super Ion CONducting) membranes selectively transport sodium cations, while LiSICON (Li Super Ion CONducting) and KSICON (K Super Ion CONducting) membranes selectively transport lithium and potassium cations, respectively. Other examples of solid alkali ion conductive electrolyte membranes include beta alumina, sodium-conductive glasses, etc.

Electrochemical cells comprising solid alkali ion conductive membranes are used to produce a variety of different chemicals and to perform various chemical processes. In some cases, such electrochemical cells convert alkali salts into their corresponding acids. In other cases, such electrochemical cells may also be used to separate alkali metals from mixed alkali salts.

One example of a conventional electrochemical cell 10 is illustrated in FIG. 1. Specifically, FIG. 1 illustrates an electrochemical cell 110 which comprises an negative electrode compartment 112 and a positive electrode compartment 114 that are separated by a NaSICON membrane 116. During operation, the negative electrode compartment 112 comprises an aqueous sodium salt solution (NaX, wherein X comprises an anion capable of combining with a sodium cation to form a salt) and current is passed between an anode 118 and a cathode 120. Additionally, FIG. 1 shows that as the cell 110 operates, water ($H_2O$) is split at the anode 118 to form oxygen gas ($O_2$) and protons ($H^+$) through the reaction $2H_2O \rightarrow O_2 + 4H^+ + 4e^-$. FIG. 1 further shows that the sodium salt NaX in the anolyte (or negative electode) solution is split (according to the reaction $NaX + H^+ \rightarrow HX + Na^+$) to (a) allow sodium cations ($Na^+$) to be transported through the NaSICON membrane 116 into the positive electrode compartment 114 and (b) to allow anions ($X^-$) to combine with protons to form an acid (HX) that corresponds to the original sodium salt.

The above-mentioned electrochemical cell may be modified for use with other alkali metals and acids corresponding to the alkali salts used in the anolyte solution. Moreover, it will be appreciated that other electrochemical reactions may occur which result in hydroxyl formation and a corresponding rise of pH within the positive electrode compartment 114. High pH catholyte solutions in such electrochemical cells have shortcomings. In one example, at a higher pH, such as a pH greater than about 10, certain alkali ion-conductive ceramic membranes, such as NaSICON membranes, begin to structurally degrade by dissolution. Accordingly, as the electrochemical cell 110 operates and base is produced in the positive electrode compartment 114, the cell 110 becomes less efficient or even inoperable. In another example, base produced in the positive electrode compartment 114 can actually damage the alkali ion conductive membrane, such as a NaSICON membrane, and thereby shorten its useful lifespan.

Batteries are a class of electrochemical cells that are used to store and release electrical energy for a variety of uses. In order to produce electrical energy, batteries typically convert chemical energy directly into electrical energy. Generally, a single battery includes one or more galvanic cells, wherein each of the cells is made of two half-cells that are electrically isolated except through an external circuit. During discharge, electrochemical reduction occurs at the cell's positive electrode, while electrochemical oxidation occurs at the cell's negative electrode. While the positive electrode and the negative electrode in the cell do not physically touch each other, they are generally chemically connected by at least one (or more) ionically conductive and electrically insulative electrolyte(s), which can either be in a solid or a liquid state, or in combination. When an external circuit, or a load, is connected to a terminal that is connected to the negative electrode and to a terminal that is connected to the positive electrode, the battery drives electrons through the external circuit, while ions migrate through the electrolyte.

Batteries can be classified in a variety of manners. For example, batteries that are completely discharged only once are often referred to as primary batteries or primary cells. In contrast, batteries that can be discharged and recharged more than once are often referred to as secondary batteries or secondary cells. The ability of a cell or battery to be charged and discharged multiple times depends on the Faradaic efficiency of each charge and discharge cycle.

Rechargeable batteries based on sodium and lithium can employ a solid primary electrolyte separator, such as a solid alkali ion conductive electrolyte membrane. The principal advantage of using a solid ion conductive electrolyte membrane is that the Faradaic efficiency of the resulting cell approaches 100%. Indeed, in almost all other cell designs, the electrode solutions in the cell are able to intermix over time and, thereby, cause a drop in Faradaic efficiency and loss of battery capacity.

Thus, while molten sodium-based rechargeable batteries are available, these batteries must be operated at temperatures above about 100° C. At such temperatures, the solid alkali ion conductive electrolyte membrane may be exposed to catholyte solutions that are chemically reactive to the alkali ion conductive electrolyte membrane making it susceptible to degradation by dissolution.

In still other conventional batteries, the electrochemical cells may be operated using molten salts which may be chemically reactive to the alkali ion conductive electrolyte membrane.

Thus, while electrochemical cells comprising a positive electrode compartment and an negative electrode compartment that are separated by a solid alkali ion-conductive membrane are known, challenges still exist, including those mentioned above. Accordingly, it would be an improvement in the art to protect the solid alkali ion conductive electrolyte membrane from undesired chemical reactions, including degradation by dissolution, and thereby maintain its structural stability and alkali ion conductivity.

BRIEF SUMMARY OF THE INVENTION

The present invention provides systems and methods for protecting a solid alkali ion-conductive electrolyte material from degradation by dissolution. The disclosed invention may advantageously be implemented in electrochemical cells containing the alkali ion conductive electrolyte membrane having conditions that would attack, degrade, dissolve, corrode, reduce the efficiency of, or otherwise adversely affect the proper function of the alkali ion conductive electrolyte membrane material. More particularly, the present invention discloses systems and methods for operating an electrochemical cell comprising a solid alkali ion conductive electrolyte membrane and an aqueous catholyte solution.

In one non-limiting embodiment, an electrochemical cell includes an negative electrode compartment comprising an anode and a positive electrode compartment comprising a cathode. The positive electrode compartment holds an aqueous catholyte solution in contact with the catholyte solution. The catholyte solution comprises concentrated halide ions or polyhalide ions pseudohalide ions or sulfide ions or polysulfide ions. A solid alkali ion conductive electrolyte membrane is positioned between the negative electrode compartment and the positive electrode compartment. The presence of concentrated halide ions polyhalide ions or pseudohalide ions or sulfide ions or polysulfide ions has been observed to substantially reduce degradation by dissolution of the solid alkali ion conductive electrolyte membrane.

In some non-limiting embodiments the halide ion or polyhalide ions or pseudohalide ions or sulfide ions or polysulfide ions concentration is greater than 1.5M. In other non-limiting embodiments, the halide ions or polyhalide ions or pseudohalide ions or sulfide ions or polysulfide ions concentration is greater than 6M. In other non-limiting embodiments, the halide ions or polyhalide ions or pseudohalide ions or sulfide ions or polysulfide ions concentration is between 3M and a saturation concentration for the halide ions or polyhalide ions or pseudohalide ions or sulfide ions or polysulfide ions at an operating temperature of the positive electrode compartment. In yet other non-limiting embodiments the halide ions or polyhalide ions or pseudohalide ions or sulfide ions or polysulfide ions concentration is between 6M and 10M.

As used herein the halide ion is selected from chloride, bromide, and iodide. The polyhalides are $X^-_{n+1}$ (where, X=I, Br, Cl; n=2, 4, 6, ... ). As used here in the polysulfide ions have the general formula $S^{2-}_{n+1}$. As used herein the pseudohalide ion is selected from azide, thiocyanate, and cyanide. Other known pseudohalide ions may also be used herein.

The solid alkali ion conductive electrolyte membrane material may include, but is not limited to, an alkali Metal Super Ion Conductive (MeSICON) material, where "Me" represents an alkali metal. Non-limiting examples of MeSICON materials include ceramic NaSICON, NaSICON-type materials, LiSICON, LiSICON-type materials, KSICON, and KSICON-type materials.

In some non-limiting embodiments, the electrochemical cell is a molten sodium rechargeable cell, wherein the anode comprises molten sodium metal in contact with the alkali ion conductive electrolyte membrane as the cell operates. In such cases, the alkali ion conductive membrane may include a NaSICON or NaSICON-type sodium ion conductive membrane. In some non-limiting embodiments, the molten sodium rechargeable cell may function at an operating temperature between about 100° C. and about 150° C. In other non-limiting embodiments, the cell functions at an operating temperature between about 110° C. and about 130° C. In some non-limiting embodiments of a molten sodium rechargeable cell, the cathode comprises nickel oxyhydroxide (NiOOH) and nickel hydroxide (Ni(OH)$_2$). In other non-limiting embodiments, the positive electrode comprises copper and copper iodide and the catholyte solution comprises sodium iodide.

The present invention provides methods for protecting a solid alkali ion-conductive electrolyte material from degradation by dissolution. In one non-limiting embodiment, the method comprises obtaining and operating an electrochemical cell as described above, wherein the presence of halide ions or complex halide ions or pseudohalide ions or sulfide ions or polysulfide ions protects the solid alkali ion conductive electrolyte membrane from degradation.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings are not made to scale, depict only some representative embodiments of the invention, and are not therefore to be considered to be limiting of its scope, the invention will be described and explained with additional specificity and detail through the use of the accompanying drawings in which:

DETAILED DESCRIPTION OF THE INVENTION

Figure 1:
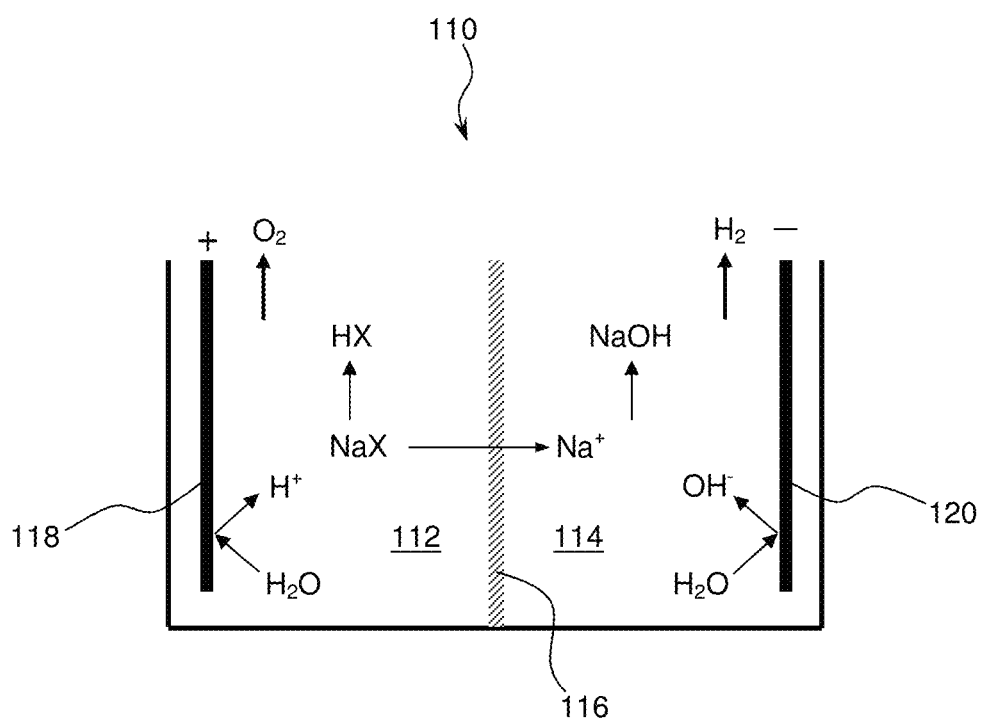
FIG. 1 depicts a schematic diagram of a typical electrochemical cell.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Additionally, while the following description refers to several embodiments and examples of the various components and aspects of the described invention, all of the described embodiments and examples are to be considered, in all respects, as illustrative only and not as being limiting in any manner.

Furthermore, the described features, structures, or characteristics of the invention may be combined in any suitable manner in one or more embodiments. In the following description, numerous specific details are given, such as examples of suitable electrochemical cells and their features, halide or pseudohalide ions, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As understood by persons skilled in the art, secondary cells can be discharged and recharged and this specification describes cell arrangements and methods for both states. Although the term "recharging" in its various forms implies a second charging, one of skill in the art will understand that discussions regarding recharging would be valid for, and applicable to, the first or initial charge, and vice versa. Thus, for the purposes of this specification, the terms "recharge," "recharged" and "rechargeable" shall be interchangeable with the terms "charge," "charged" and "chargeable" respectively.

The disclosed invention provides systems and methods for protecting a solid alkali ion-conductive electrolyte material from degradation by dissolution. It has been discovered that solid alkali ion conductive electrolyte membrane materials experience minimal corrosion or dissolution when exposed to solutions containing concentrated halide ions or pseudohalide ions, especially at elevated temperatures. As used herein, elevated temperatures means a temperature greater than room temperature. In some non-limiting embodiments, an elevated temperature includes a temperature greater than 40° C. In other non-limiting embodiments, an elevated temperature includes a temperature greater than 60° C. In still other non-limiting embodiments, an elevated temperature includes a temperature greater than 80° C. In yet other non-limiting embodiments, an elevated temperature includes a temperature greater than 100° C.

As used herein the halide ion is selected from chloride, bromide, and iodide. As used herein the pseudohalide ion is selected from azide, thiocyanate, and cyanide. Other known pseudohalide ions may also be used herein.

In some non-limiting embodiments the halide ion or pseudohalide ion concentration is greater than 3M. In other non-limiting embodiments, the halide ion or pseudohalide ion concentration is greater than 6M. In other non-limiting embodiments, the halide ion or pseudohalide ion concentration is between 3M and a saturation concentration for the halide ion or pseudohalide ion at an operating temperature of the positive electrode compartment. In yet other non-limiting embodiments the halide ion or pseudohalide ion concentration is between 6M and 10M.

The solid alkali ion conductive electrolyte membrane material may include, but is not limited to, an alkali Metal Super Ion Conductive (MeSICON) material, where "Me" represents an alkali metal. Non-limiting examples of MeSICON materials include ceramic NaSICON, NaSICON-type materials, LiSICON, LiSICON-type materials, KSICON, and KSICON-type materials.

Figure 2:
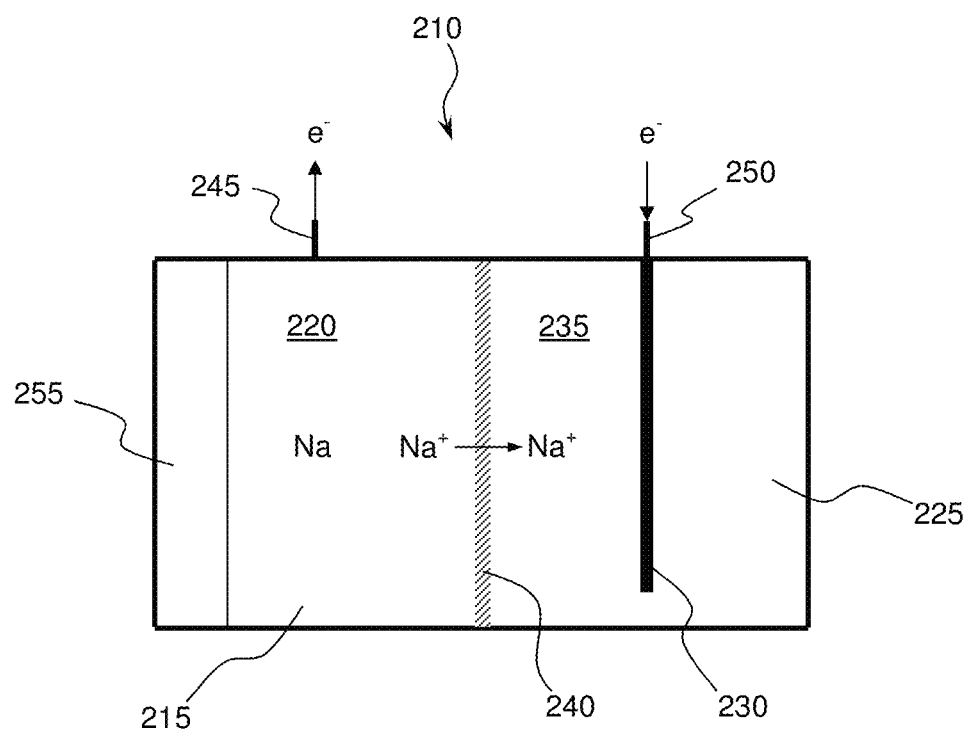
FIG. 2 depicts a schematic diagram of a representative embodiment of a molten sodium secondary cell, wherein the cell is in the process of being discharged.

One non-limiting application of the disclosed invention is in a molten sodium secondary cell that functions at an operating temperature between about 100° C. and about 150° C. While the described cell can comprise any suitable component, FIG. 2 shows a representative embodiment in which the molten sodium secondary cell 210 comprises an negative electrode compartment 215 that includes a metal sodium negative electrode 220, a positive electrode compartment 225 that comprises a positive electrode 230 that is disposed in a liquid positive electrode solution 235, a sodium ion conductive electrolyte membrane 240 that separates the negative electrode from the positive electrode solution, a first terminal 245, and a second terminal 250. To provide a better understanding of the described cell 210, a brief description of how the cell functions is provided below. Following this discussion, each of the cell's components shown in FIG. 2 is discussed in more detail.

Turning now to the manner in which the molten sodium secondary cell 210 functions, the cell can function in virtually any suitable manner. In one example, FIG. 2 illustrates that as the cell 210 is discharged and electrons (e$^-$) flow from the negative electrode 220 (e.g., via the first terminal 245), sodium is oxidized from the negative electrode 220 to form sodium ions (Na$^+$). FIG. 2 shows that these sodium ions are respectively transported from the sodium negative electrode 220, through the sodium ion conductive membrane 240, and to the positive electrode solution 235.

Figure 3:
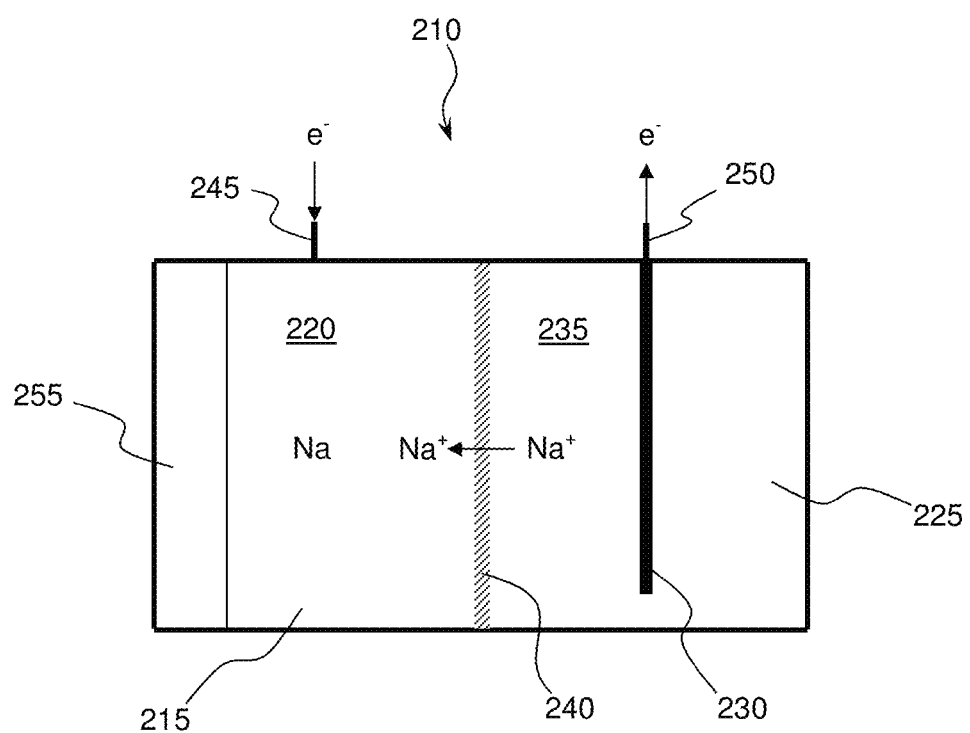
FIG. 3 depicts a schematic diagram of a representative embodiment of the molten sodium secondary cell, wherein the cell is in the process of being recharged.

In a contrasting example, FIG. 3 shows that as the secondary cell 210 is recharged and electrons (e$^-$) flow into the sodium negative electrode 220 from an external power source (not shown), such as a recharger, the chemical reactions that occurred when the cell 10 was discharged (as shown in FIG. 1) are reversed. Specifically, FIG. 3 shows that as the cell 210 is recharged, sodium ions (Na$^+$) are respectively transported from the positive electrode solution 235, through the electrolyte membrane 240, and to the negative electrode 220, where the sodium ions are reduced to form sodium metal (Na).

Referring now to the various components of the cell 210, the cell, as mentioned above, can comprise a negative electrode compartment 215 and a positive electrode compartment 225. In this regard, the two compartments can be any suitable shape and have any other suitable characteristic that allows the cell 210 to function as intended. By way of example, the negative electrode and the positive electrode compartments can be tubular, rectangular, or be any other suitable shape. Furthermore, the two compartments can have any suitable spatial relationship with respect to each other. For instance, while FIG. 3 shows that the negative electrode compartment 215 and the positive electrode compartment 225 can be adjacent to each other, in other embodiments (not shown), one compartment (e.g., the negative electrode compartment) is disposed, at least partially, in the other compartment (e.g., the positive electrode compartment), while the contents of the two compartments remain separated by the electrolyte membrane 40 and any other compartmental walls.

With respect to the negative electrode 220, the cell 210 can comprise any suitable sodium negative electrode 220 that allows the cell 210 to function (e.g., be discharged and recharged) as intended. Some examples of suitable sodium negative electrode materials include, but are not limited to, a sodium sample that is substantially pure and a sodium alloy comprising any other suitable sodium-containing negative electrode material. In certain embodiments, however, the negative electrode comprises or consists of an amount of sodium that is substantially pure. In such embodiments, because the melting point of pure sodium is around 98° C., the sodium negative electrode will become molten above that temperature.

With respect to the positive electrode 230, the cell 210 can comprise any suitable positive electrode that allows the cell to be charged and discharged as intended. For instance, the positive electrode can comprise virtually any positive electrode material that has been successfully used in a sodium-based rechargeable battery system. In some embodiments, the positive electrode comprises a wire, felt, plate, tube, mesh, foam, and/or other suitable positive electrode configuration. In one non-limiting embodiment, the positive electrode comprises a nickel foam, nickel hydroxide (Ni(OH)$_2$), nickel oxyhydroxide (NiOOH), sulfur composites, sulfur halides, including sulfuric chloride, and/or another suitable material. Furthermore, these materials may coexist or exist in combinations. In another non-limiting embodiment, the positive electrode comprises copper and copper iodide and the catholyte solution comprises sodium iodide.

For example a suitable positive electrode material may be nickel oxyhydroxide (NiOOH) (e.g., when the cell is at least partially charged) and nickel hydroxide (Ni(OH)$_2$) (e.g., when the cell is at least partially discharged). In certain embodiments, however, the positive electrode comprises a nickel oxyhydroxide (NiOOH) electrode. It is understood that a nickel oxyhydroxide electrode, even when fully charged, will contain some amount of nickel hydroxide. In another non-limiting embodiment, the positive electrode comprises copper and copper iodide and the catholyte solution comprises sodium iodide.

In some non-limiting embodiments where the positive electrode 230 comprises a nickel oxyhydroxide (NiOOH) electrode, the negative electrode 220 comprises sodium, and the positive electrode solution 235 (as discussed below) comprises an aqueous solution, the reactions that occur at the negative electrode and at the positive electrode and the overall reaction as the cell 210 is discharged may occur as illustrated below:

Negative electrode Na→Na$^+$+e$^-$ (−2.71V)

Positive electrode NiOOH+H$_2$O→Ni(OH)$_2$+OH$^-$ (0.52V)

Overall Na+NiOOH+H$_2$O→Ni(OH)$_2$+NaOH (3.23V)

Accordingly, the above embodiment of the describe cell 210, at least theoretically, are capable of producing about 3.2V±0.5V at standard temperature and pressure.

Moreover, some examples of overall reactions that may occur during the discharging and charging of a cell in which the positive electrode 230 comprises a nickel oxyhydroxide (NiOOH) electrode, the negative electrode 220 comprises sodium, and the positive electrode solution 235 (as discussed below) comprises an aqueous solution, are shown below:

(Discharge) NiOOH+H$_2$O+Na+→Ni(OH)$_2$+NaOH (Charge) Ni(OH)$_2$+NaOH→NiOOH+H$_2$O+Na In another non-limiting embodiment, the positive electrode comprises and the catholyte solution comprises sodium iodide.

In some non-limiting embodiments where the positive electrode 230 comprises copper and copper iodide, the negative electrode 220 comprises sodium, and the positive electrode solution 235 comprises sodium iodide, the reactions that occur at the negative electrode and at the positive electrode and the overall reaction as the cell 210 is discharged may occur as illustrated below:

Negative electrode Na→Na$^+$+e$^-$ (−2.71V)

Positive electrode e$^-$+CuI$_2$$^-$→Cu+2I$^-$ (−0.19V)

Overall Na+CuI$_2$$^-$→Cu+NaI+I$^-$ (2.51V)

Accordingly, the above embodiment of the describe cell 210, at least theoretically, are capable of producing about 2.5 V±0.5V at standard temperature and pressure.

Examples of overall reactions that may occur during the charging of a cell in which the positive electrode 230 comprises a copper and copper iodide electrode, the negative electrode 220 comprises sodium, and the positive electrode solution 235 comprises sodium iodide, are shown below:

Negative electrode Na$^+$+e$^-$→Na

Positive electrode Cu→Cu$^+$+e$^-$

Cu$^+$+I$^-$→CuI

CuI+I$^-$→CuI$_2$$^-$

Overall Cu+NaI+I$^-$→Na+CuI$_2$$^-$

With reference now to the terminals 245 and 250, the cell 210 can comprise any suitable terminals that are capable of electrically connecting the cell with an external circuit, including without limitation, to one or more cells. In this regard, the terminals can comprise any suitable material and any suitable shape of any suitable size.

In addition to the aforementioned components, the cell 210 can optionally comprise any other suitable component. By way of non-limiting illustration FIGS. 2 and 3 shows an embodiment in which the cell 210 comprises a heat management system 255. In such embodiments, the cell can comprise any suitable type of heat management system that is capable of maintaining the cell within a suitable operating temperature range. Some examples of such heat management systems include, but are not limited to, a heater, one or more temperature sensors, and appropriate temperature control circuitry.

The described cell 210 may function at any suitable operating temperature. In other words, as the cell is discharged and/or recharged, the sodium negative electrode may have any suitable temperature. Indeed, in some embodiments, the cell functions at an operating temperature that is as high as a temperature selected from about 120° C., about 130° C., and about 150° C. Moreover, in such embodiments, as the cell functions, the temperature of the negative electrode can be as low as a temperature selected from about 120° C., about 115° C., about 110° C., and about 100° C. Indeed, in some embodiments, as the cell functions, the temperature of the negative electrode between about 100° and about 150° C. In other embodiments, the cell functions at a temperature between about 100° and about 130° C. In yet other embodiments, however, as the cell functions, the temperature of the negative electrode is about 120° C.±about 10° C.

The following examples are given to illustrate various embodiments within, and aspects of, the scope of the present invention. These are given by way of example only, and it is understood that the following examples are not comprehensive or exhaustive of the many types of embodiments of the present invention that can be prepared in accordance with the present invention.

EXAMPLE 1

Figure 4:
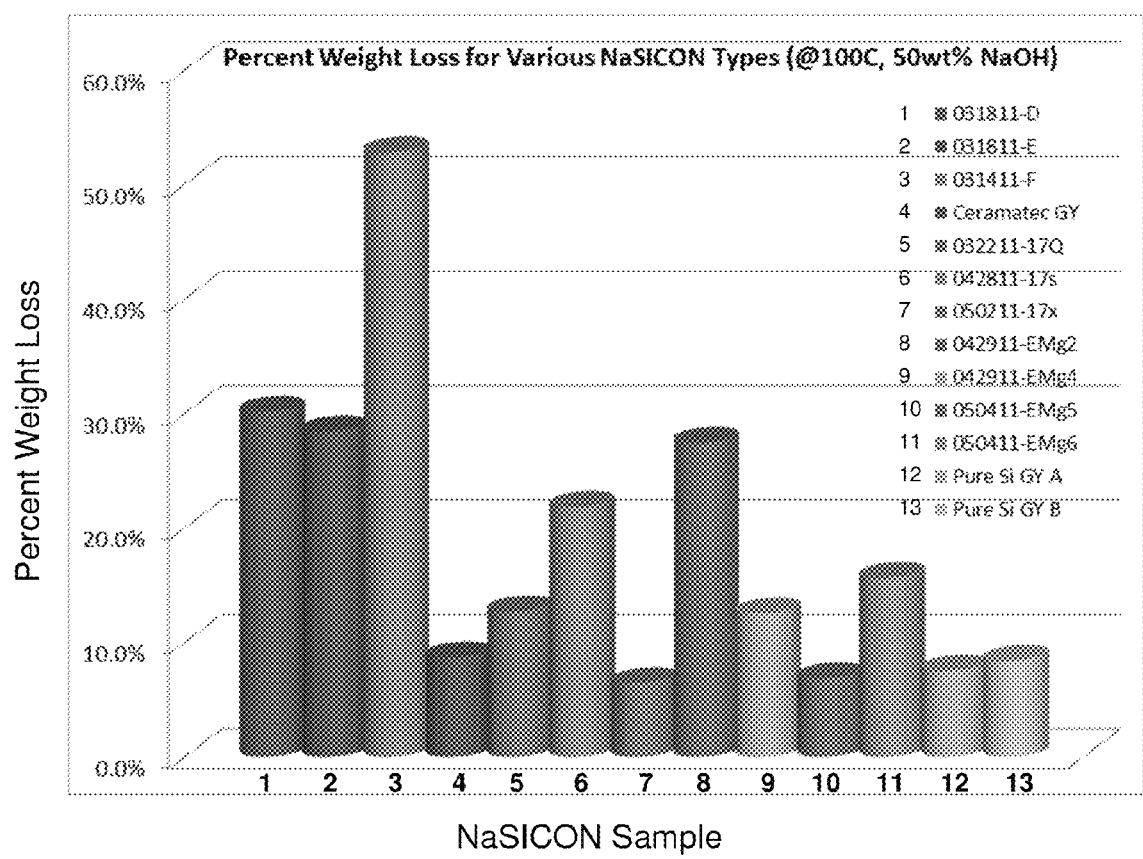
FIG. 4 depicts a graph of percent weight loss for various NaSICON samples in 50 wt. % NaOH at 100° C.

Thirteen different NaSICON and NaSICON-type materials manufactured by Ceramatec, Inc., Salt Lake City, Utah, were placed in 50 wt. % NaOH at 100° C. The samples were removed and weighed to measure weight loss due to dissolution. The samples all experienced weight loss ranging from about 6.5 wt. % to great than 50 wt. %. The results are shown in FIG. 4.

EXAMPLE 2

Four different formulations of a NaSICON material were placed in 50 wt. % NaOH at 100° C. for a period of nine weeks to measure weight loss due to dissolution. Three samples of each formulation were weighed each week.

Figure 5:
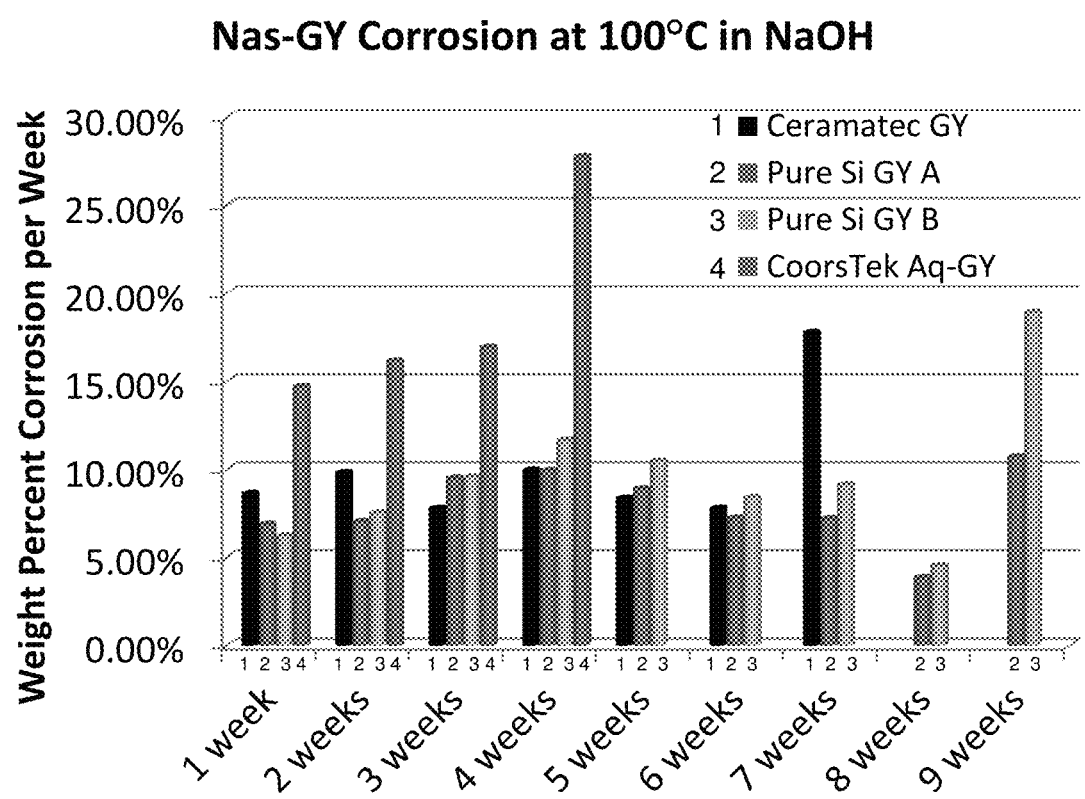
FIG. 5 depicts a graph of percent weight loss per week for various NaSICON samples in 50 wt. % NaOH at 100° C. over a nine week period.

For each different formulation, three samples were pre-weighed on a 4-place analytical balance and the weight was recorded. Then the samples were placed into a plastic container with a screw sealed lid containing 50 wt. % NaOH solution. The container with the solution and samples was placed in an oven set to 100° C. and allowed to sit for one week. After a week the samples were removed from the solution and thoroughly rinsed with water. The samples were then sonicated in a sonic bath of DI water, and then dried for 1 hour at 100° C. Once dried, the samples were then weighed again using the same calibrated balance. The new weight for each sample was recorded. The weight loss from week to week was measured as a percent loss. Each of the three samples per formulation were averaged together to get the data shown in FIG. 5.

EXAMPLE 3

Three different formulations of a NaSICON material were placed in different sodium halide solutions at 100° C. (6 M NaI, 53 wt. % NaBr, 25 wt. % NaCl) for a period of nine weeks to measure weight loss due to dissolution. Three samples of each formulation were weighed each week.

Figure 6:
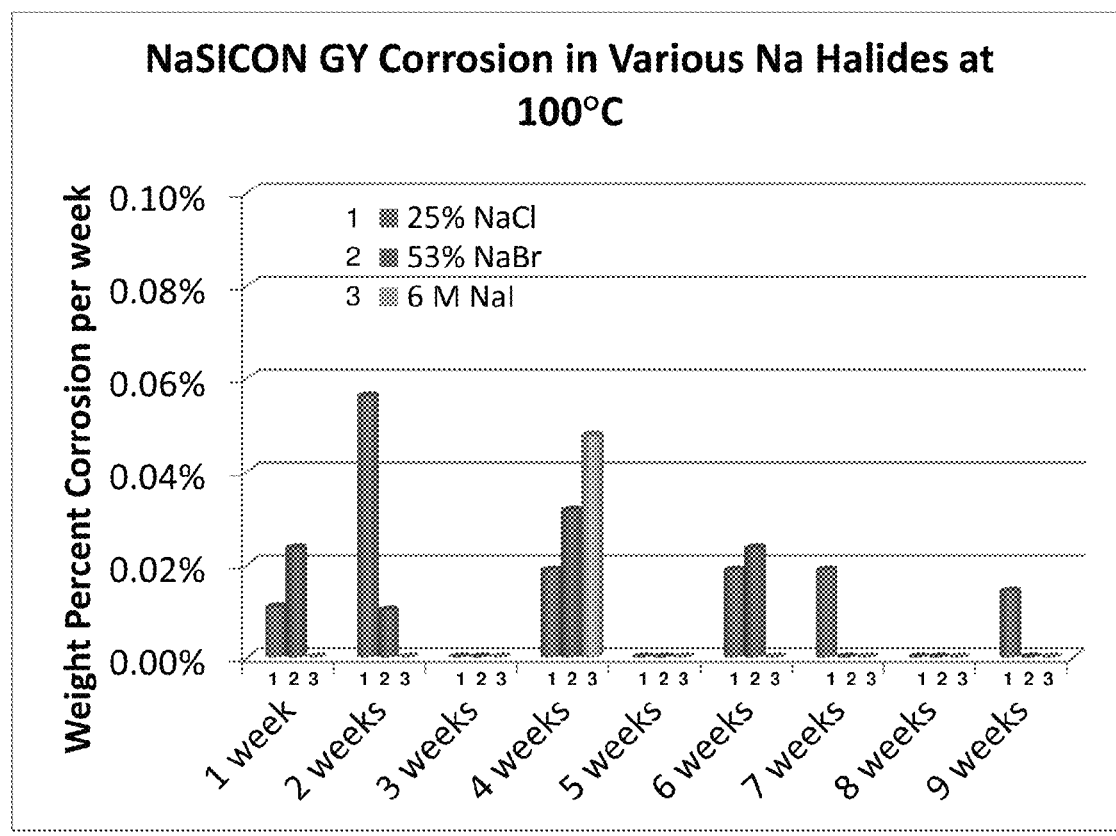
FIG. 6 depicts a graph of percent weight loss per week for various NaSICON samples in three different sodium halide solutions at 100° C. over a nine week period.
Figure 7:
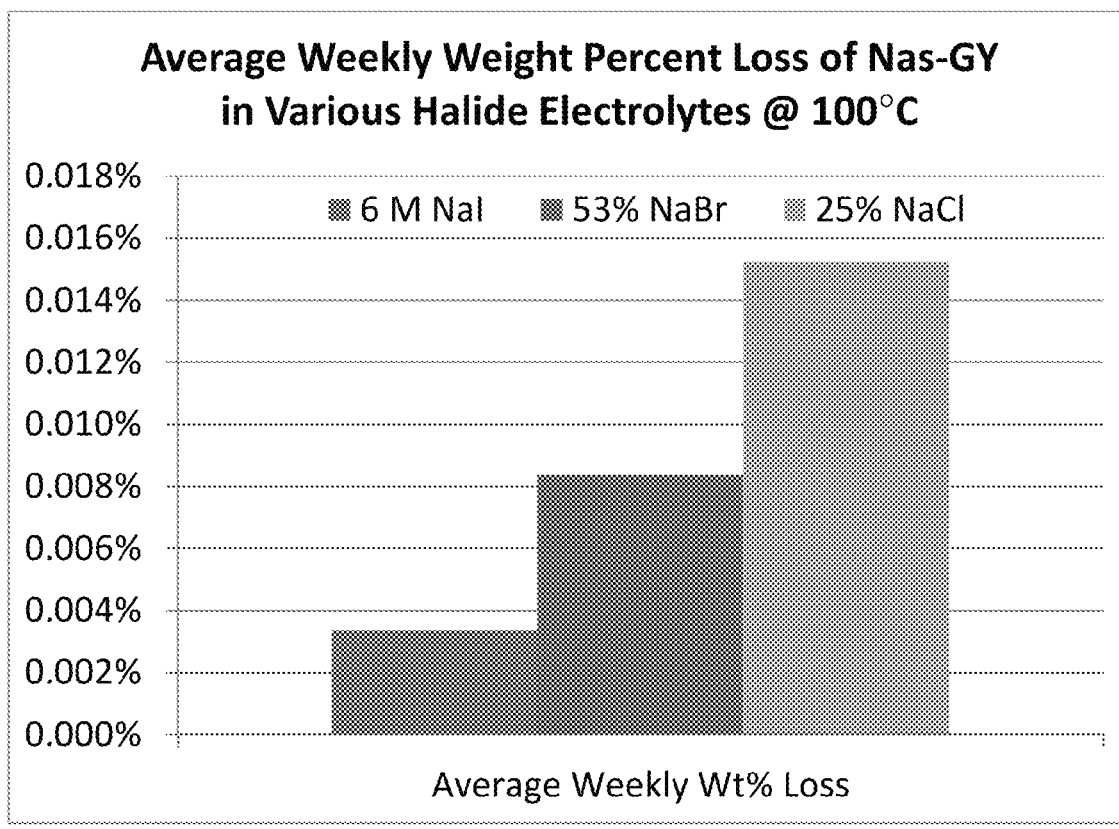
FIG. 7 depicts a graph of the average weekly weight percent loss of the samples in the different sodium halide solution as reported in FIG. 4.

For each different formulation, three samples were pre-weighed on a 4-place analytical balance and the weight was recorded. Then the samples were placed into a plastic container with a screw sealed lid containing the respective sodium halide solution. The container with the solution and samples was placed in an oven set to 100° C. and allowed to sit for one week. After a week the samples were removed from the solution and thoroughly rinsed with water. The samples were then sonicated in a sonic bath of DI water, and then dried for 1 hour at 100° C. Once dried, the samples were then weighed again using the same calibrated balance. The new weight for each sample was recorded. The weight loss from week to week was measured as a percent loss. Each of the three samples per formulation were averaged together to get the data shown in FIG. 6. The average weekly weight percent loss of the samples in the different sodium halide solution is set forth in FIG. 7.

EXAMPLE 4

Four different formulations of a NaSICON material were placed in different sodium iodide solutions at 120° C. (10M NaI 6M NaI and 3M iodine, 6M NaI, 6M NaI and 20 wt. % borax) for a period of nine weeks to measure weight loss due to dissolution. The 6M NaI and 3M iodine was made by dissolving sodium iodide salt into DI water and then adding 3M iodine crystals to the solution to try and increase the iodine content of the salt solution. Three samples of each formulation were weighed each week.

Figure 8:
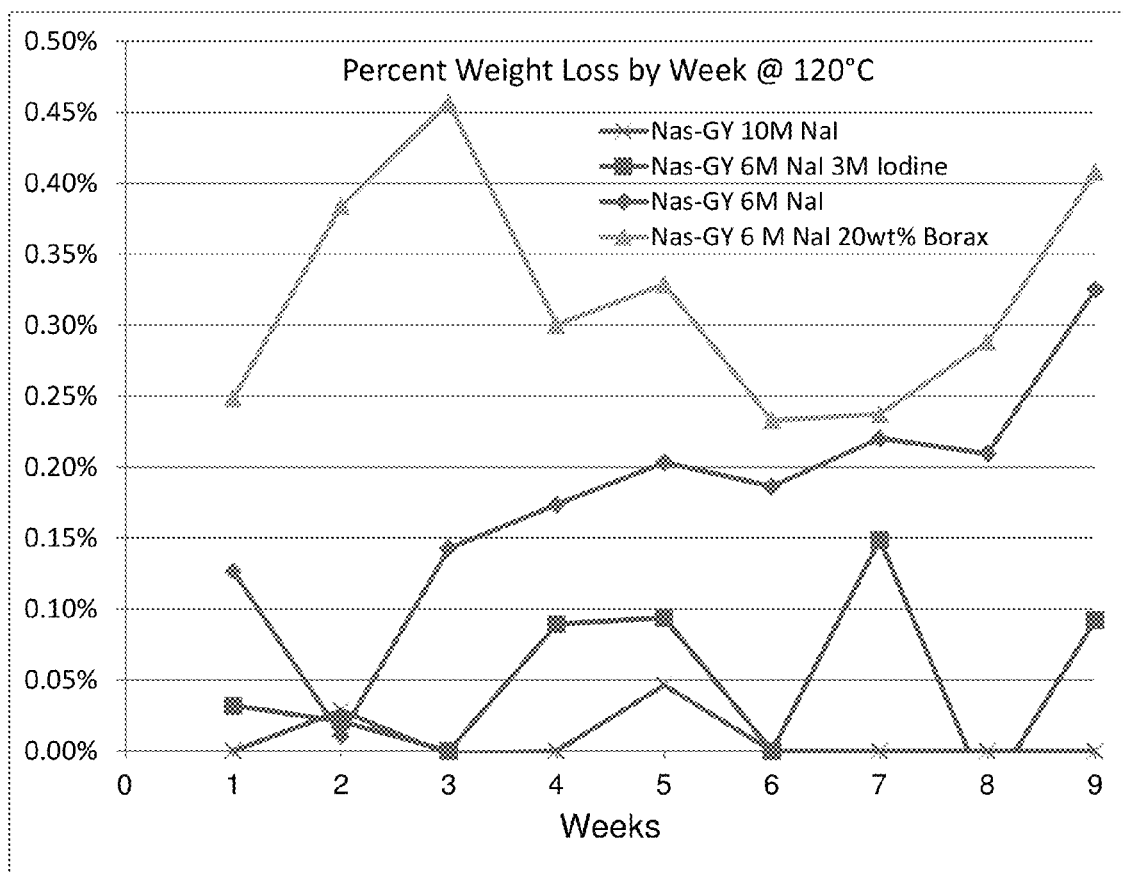
FIG. 8 depicts a graph of percent weight loss per week for a given NaSICON sample in four different sodium iodide solutions at 120° C. over a nine week period.

For each different formulation, three samples were pre-weighed on a 4-place analytical balance and the weight was recorded. Then the samples were placed into a plastic container with a screw sealed lid containing the respective sodium iodide solution. The container with the solution and samples was placed in an oven set to 120° C. and allowed to sit for one week. After a week the samples were removed from the solution and thoroughly rinsed with water. The samples were then sonicated in a sonic bath of DI water, and then dried for 1 hour at 120° C. Once dried, the samples were then weighed again using the same calibrated balance. The new weight for each sample was recorded. The weight loss from week to week was measured as a percent loss. Each of the three samples per sodium iodide solution were averaged together to get the data shown in FIG. 8.

EXAMPLE 5

Figure 9:
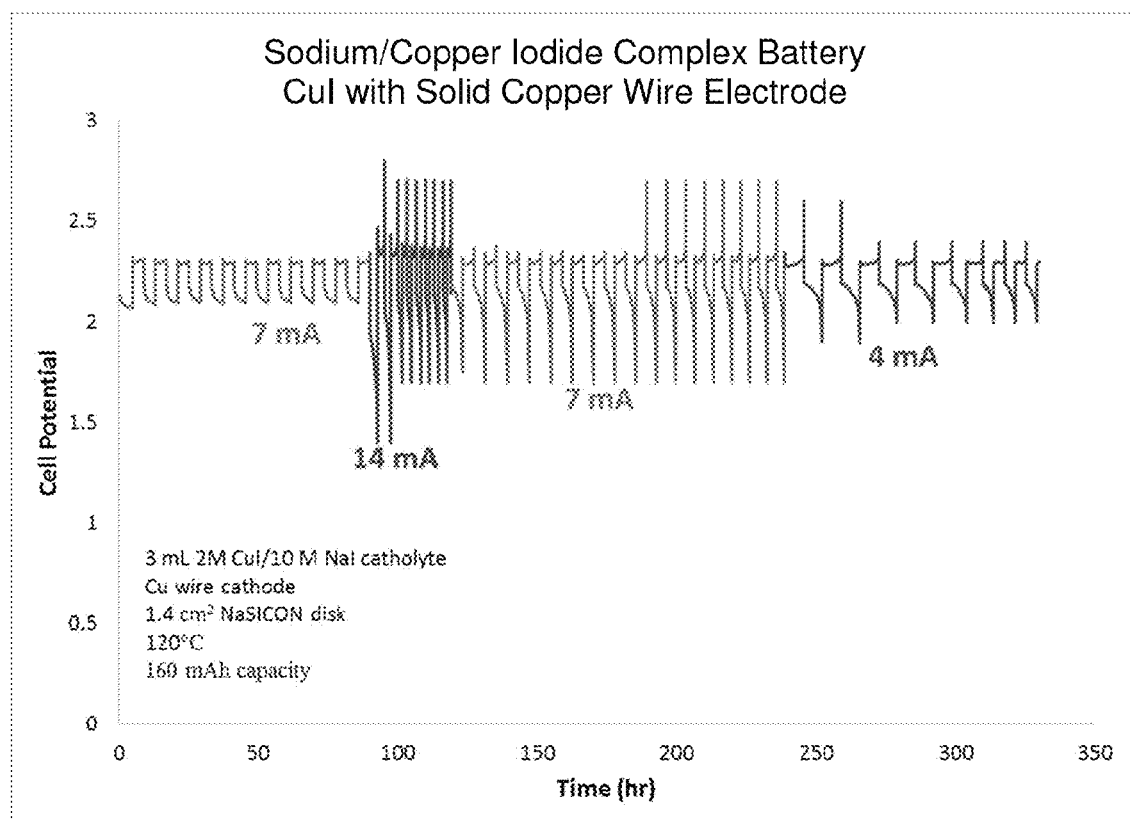
FIG. 9 depicts a graph of cell potential over time of the various charge/discharge cycles of a molten sodium secondary cell having a NaSICON membrane and 10 M NaI catholyte solution.

A molten sodium secondary cell (battery) was prepared and operated. The negative electrode (anode) was molten sodium and the positive electrode (cathode) was copper wire and copper iodide. A 1.4 cm$^2$ disk comprising NaSICON sodium ion conductive electrolyte membrane was disposed between the negative and positive electrodes. The positive electrode (or catholyte) solution contained 3 mL of 2M CuI in 10M NaI. The cell underwent 43 charge/discharge cycles over about 330 hours. It was operated at a temperature of 120° C. The discharge voltage was about 2.15 V. FIG. 9 is a graph of cell potential over time of the various charge/discharge cycles. Without being bound by theory, it is believed during charge cycles, CuI solubilizes due to complexation with excess iodide ions to form a CuI complex. During discharge cycles, copper plates onto the cathode. Following operation of the secondary cell, the NaSICON electrolyte did not suffer noticeable degradation by dissolution.

While specific embodiments and examples of the present invention have been illustrated and described, numerous modifications come to mind without significantly departing from the spirit of the invention, and the scope of protection is only limited by the scope of the accompanying claims.

The invention claimed is:

1. An electrochemical cell, comprising:
   an negative electrode compartment comprising an anode;
   a positive electrode compartment for holding an aqueous catholyte solution, the positive electrode compartment comprising a cathode positioned to contact the catholyte solution, wherein the catholyte solution comprises a halide ion or polyhalide ion or pseudohalide ion or sulfide ion or polysulfide ion concentration greater than 1.5M;
   a solid alkali ion conductive electrolyte membrane positioned between the negative electrode compartment and the positive electrode compartment.

2. The electrochemical cell of claim 1, wherein the halide ion or polyhalide ion or pseudohalide ion or sulfide ion or polysulfide ion concentration is greater than 6M.

3. The electrochemical cell of claim 1, wherein the halide ion or polyhalide ion or pseudohalide ion or sulfide ion or polysulfide ion concentration is greater than 3M.

4. The electrochemical cell of claim 1, wherein the halide ion or polyhalide ion or pseudohalide ion or sulfide ion or polysulfide ion concentration is between 3M and a saturation concentration for the respective halide ion or polyhalide ion or pseudohalide ions or sulfide ion or pseudohalide ion at an operating temperature of the positive electrode compartment.

5. The electrochemical cell of claim 1, wherein the halide ion or polyhalide ion or pseudohalide ion or sulfide ion or polysulfide ion concentration is between 6M and 10M.

6. The electrochemical cell of claim 1, wherein the halide ion or pseudohalide ion is selected from chloride, bromide, iodide, azide, thiocyanate, and cyanide.

7. The electrochemical cell of claim 1, wherein the solid alkali ion conductive electrolyte membrane comprises a material selected from a ceramic NaSICON or NaSICON-type material, a ceramic LiSICON or LiSICON-type material, and a KSICON or KSICON-type material.

8. The electrochemical cell of claim 1, wherein the electrochemical cell is a molten sodium rechargeable cell, wherein the anode comprises molten sodium metal in contact with the conductive electrolyte membrane as the cell operates, wherein the alkali ion conductive membrane comprises a NaSICON-type, sodium ion conductive membrane, and wherein the cell functions at an operating temperature between about 100° C. and about 150° C.

9. The electrochemical cell of claim 8, wherein the cell functions at an operating temperature between about 110° C. and about 130° C.

10. The electrochemical cell of claim 8, wherein the cathode comprises nickel oxyhydroxide and nickel hydroxide.

11. The electrochemical cell of claim 8, wherein the cathode comprises copper and copper iodide and the catholyte solution comprises sodium iodide or sodium polyhalide.

12. The electrochemical cell of claim 8, wherein the cathode comprises sulfur and polysulfide and the catholyte solution comprises sodium sulfide or sodium polysulfide.

13. A method for protecting a solid alkali ion conductive electrolyte membrane from degradation comprising:
   obtaining an electrochemical cell comprising:
      an negative electrode compartment comprising an anode;
      a positive electrode compartment comprising a cathode for holding an aqueous catholyte solution, the positive electrode compartment comprising a cathode positioned to contact the catholyte solution, wherein the catholyte solution comprises a halide ion or pseudohalide ion concentration greater than 3M; and
      a solid alkali ion conductive electrolyte membrane positioned between the negative electrode compartment and the positive electrode compartment; and
   operating the electrochemical cell, wherein the presence of halide or pseudohalide ions protects the solid alkali ion conductive electrolyte membrane from degradation.

14. The method of claim 13, wherein the halide ion or pseudohalide ion concentration is greater than 6M.

15. The method of claim 13, wherein the halide ion or pseudohalide ion concentration is between 3M and a saturation concentration for the halide ion or pseudohalide ion at an operating temperature of the positive electrode compartment.

16. The method of claim 13, wherein the halide ion or pseudohalide ion concentration is between 3M and 10M.

17. The method of claim 13, wherein the halide ion or pseudohalide ion is selected from chloride, bromide, iodide, azide, thiocyanate, and cyanide.

18. The method of claim 13, wherein the solid alkali ion conductive electrolyte membrane comprises a material selected from a ceramic NaSICON or NaSICON-type material, a ceramic LiSICON or LiSICON-type material, and a KSICON or KSICON-type material.

19. The method of claim 13, wherein the electrochemical cell is a molten sodium rechargeable cell, wherein the anode comprises molten sodium metal in contact with the conductive electrolyte membrane as the cell operates, wherein the alkali ion conductive membrane comprises a NaSICON-type, sodium ion conductive membrane, and wherein the cell functions at an operating temperature between about 100° C. and about 150° C.

20. The method of claim 19, wherein the cell functions when the operating temperature is between about 110° C. and about 130° C.

21. The method of claim 19, wherein the cathode comprises nickel oxyhydroxide and nickel hydroxide.

22. A molten sodium secondary cell, comprising:
   a negative electrode, which electrochemically oxidizes to release sodium ions during discharge and electrochemically reduces sodium ions to sodium metal during recharging;
   a positive electrode compartment comprising a positive electrode disposed in an aqueous liquid positive electrode solution, wherein the aqueous liquid positive electrode solution comprises a halide ion or pseudohalide ion concentration greater than 3M; and
   a solid sodium ion conductive electrolyte membrane that separates the negative electrode from the liquid positive electrode solution,
   wherein the negative electrode is molten and in contact with the conductive electrolyte membrane as the cell operates, and wherein the cell functions at an operating temperature between about 100° C. and about 150° C.

23. The molten sodium secondary cell of claim 22, wherein the halide ion or pseudohalide ion concentration is greater than 6M.

24. The molten sodium secondary cell of claim 22, wherein the halide ion or pseudohalide ion concentration is between 6M and a saturation concentration for the halide ion or pseudohalide ion.

25. The molten sodium secondary cell of claim 22, wherein the halide ion or pseudohalide ion concentration is between 6M and 10M.

26. The molten sodium secondary cell of claim 22, wherein the halide ion or pseudohalide ion is selected from chloride, bromide, iodide, azide, thiocyanate, and cyanide.

27. The molten sodium secondary cell claim 22, wherein the solid sodium ion conductive electrolyte membrane comprises a material selected from a ceramic NaSICON or NaSICON-type material.

28. The molten sodium secondary cell of claim 22, wherein the cell functions at an operating temperature between about 110° C. and about 130° C.

29. The molten sodium secondary cell of claim 22, wherein the positive electrode comprises copper and copper iodide.

\* \* \* \* \*